Feb. 2, 1971

C. M. TABALBA 3,560,839

RECTIFIER CIRCUIT

Filed Aug. 26, 1969

Inventor
C. M. Tabalba
By James B. Raden
Attorney 3,560,839

RECTIFIER CIRCUIT

Camillo Manansala Tabalba, Basildon, Essex, England, assignor to International Standard Electric Corporation, New York, N.Y., a corporation of Delaware Filed Aug. 26, 1969, Ser. No. 853,179
Claims priority, application Great Britain, Sept. 11, 1968, 43,142/68
Int. Cl. H02m 7/12
U.S. Cl. 321—47 4 Claims

ABSTRACT OF THE DISCLOSURE

This invention provides a full wave rectifier circuit supplying an unbalanced load from an unbalanced source without the use of a transformer. One terminal of the source and the load is common. Two transistors, one in a common base and the other in a common emitter configuration, supply the load during alternate halfwaves. The circuit can be used either for unmodulated signals or as an envelope detector for amplitude modulated signals.

This invention relates to alternating current rectifier circuits and more particularly to circuits suitable for use in equipments assembled from integrated circuit components.

In miniaturised electronic equipment using semiconductor devices there is a need for a rectifier circuit in which an alternating current from an unbalanced source is to be full wave rectified and applied to an unbalanced load, so that one terminal of the source and one terminal of the load can be strapped together and, if required, connected to earth.

Full wave rectifier circuits are known in which a transformer is used to isolate the source from the load. A circuit is also known in which one terminal of the source can be connected to one terminal of the load without the use of a transformer. This circuit is not however a full wave rectifier in so far as only one pulse of power is delivered to the load during a full cycle of the alternating current wave and the ripple frequency superimposed on the rectified output is at the frequency of the alternating current signal and not at twice that frequency, which is a characteristic of a full wave rectifier circuit.

According to the invention there is provided a full wave rectifier circuit of the kind in which a pulse of power is delivered to a load for each half-wave of an alternating current input signal and in which, without the use of an isolating transformer, one terminal of the source of input signal and one terminal of the load are common, comprising a first transistor having its emitter electrode connected to the other terminal of the source of input signal via a capacitor and its collector connected to the other terminal of the load, a second transistor having its collector connected to said other terminal of the load and its emitter to a terminal of a source of direct current power, the base of each transistor being connected to the emitter electrode of the other transistor wherein the said transistors conduct alternately and means connected across the base emitter electrodes of the second transistor, so that the rectifier circuit presents to the source of input signal substantially equal impedances during each half-wave of the input signal.

Figure 1:
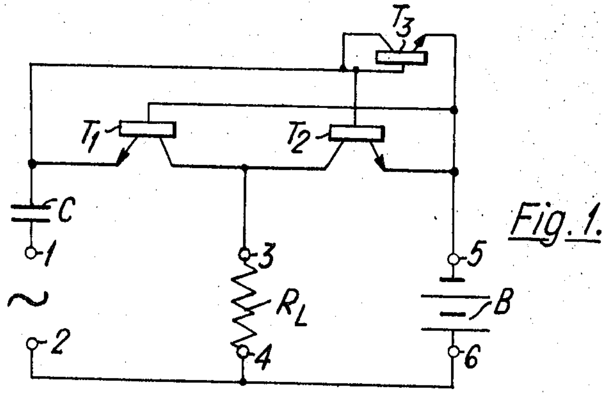
Figure 2:
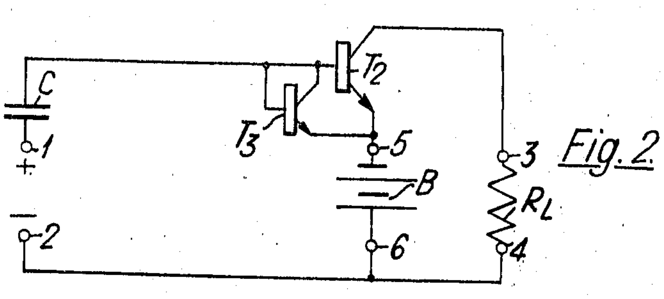
Figure 3:
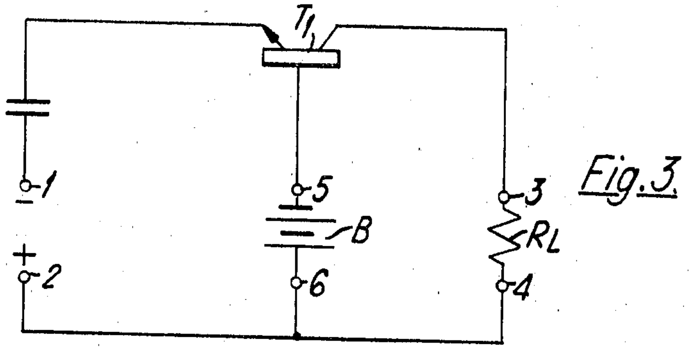

The invention will now be described with reference to the accompanying drawings in which:

FIG. 1 shows in schematic form a rectifier circuit according to an embodiment of the invention and FIGS. 2 and 3 will be found useful in explaining the operation of the circuit of FIG. 1.

In the circuit of FIG. 1 a source of alternating current, not shown, is connected to terminals 1 and 2, a load $R_L$ is connected to terminals 3 and 4 and a source B of direct current power is connected to terminals 5 and 6 of the circuit, terminals 2, 4 and 6 being strapped together.

The emitter-collector circuit of transistor $T_1$ is connected via blocking capacitor C between the source of alternating current signal and the load and the emitter-collecctor circuit of transistor $T_2$ is connected between the battery B and the load. The base electrode of each transistor is connected to the emitter electrode of the other transistor. A third transistor $T_3$, which is connected as a diode, the purpose of which will be explained later, is connected across the base and emitter electrodes of transistor $T_2$ so that when terminal 1 of the circuit is positive with respect to terminal 2, transistor $T_3$ becomes conductive.

It will of course be understood that although n-p-n transistors are shown in FIG. 1, p-n-p transistors can be used provided the polarity of direct current source is reversed.

The operation of the circuit will now be described. During the half-wave of the alternating current signal which makes terminal 1 positive with respect to terminal 2, transistor $T_1$ is nonconductive, so that the circuit reduces to that shown in FIG. 2. It is seen that on the assumption that the battery presents zero impedance to the alternating current signal, the circuit is identical to a common emitter amplifier circuit. During the positive half cycle the load current will be proportional to the amplitude of the input signal provided transistor $T_2$ is not driven into saturation.

During the following half cycle i.e. when terminal 1 is negative with respect to terminal 2 transistors $T_2$ and $T_3$ are non-conductive and the circuit reduces to that shown in FIG. 3. Making the previous assumption that the battery presents zero impedance to the alternating current signal the circuit is seen to be equivalent to a common base amplifier circuit, which also delivers to the load a current which is proportional to the amplitude of the input signal, so long as transistor $T_2$ is not driven into saturation.

From the above it is seen that the rectified current in the load circuit comes alternately from a common collector or a common base amplifier circuit. An essential requirement for a full wave rectifier is that its operation must be symmetrical i.e. that for a given amplitude of the input signal the amplitudes of both rectified halfwaves are equal and that the input impedance presented by the rectifier circuit to the source of input signal must be the same for positive and negative going half waves.

The circuit so far described does not satisfy the above requirement for symmetrical operation since the input impedance and the gain of a common base amplifier stage differs from that of a common emitter amplifier stage. If a diode is bridged across the base-emitter path of transistor $T_2$ and is arranged to pass a current substantially equal to that passed by the collector of $T_2$ then the input imepdance and the gain of the combination of $T_2$ and the diode would be very nearly equal to that of the common base amplifier stage realised by transistor $T_1$.

A simple way to ensure the equality of currents flowing in the collector of $T_2$ and the diode is to replace the latter by a third transistor $T_3$, as indicated in FIG. 1, having its base and collector electrodes strapped.

On the assumption that the characteristics of $T_3$ and $T_2$ are identical, the collector current of $T_3$ will be substantially equal to that of $T_2$.

If individual transistors are used in realising the circuit, transistors having similar characteristics must be selected. A much better way to achieve the required similarity of characteristics is to use integrated circuit modules in which the transistors $T_1$, $T_2$ and $T_3$ are made of a single semiconductor chip.

The circuit according to the invention can be used either for rectifying unmodulated AC signals or as an envelope detector for amplitude modulated signals.

It is to be understood that the foregoing description of specific examples of this invention is not to be considered as a limitation of its scope.

I claim:

1. A full wave rectifier circuit of the kind in which a pulse of power is delivered to a load for each halfwave of an alternating current input signal and in which, without the use of an isolating transformer, one terminal of the source of input signal and one terminal of the load are common, comprising a first transistor having its emitter electrode connected to the other terminal of the source of input signal via a capacitor and its collector connected to the other terminal of the load, a second transistor having its collector connected to said other terminal of the load and its emitter to a terminal of a source of direct current power, the base of each transistor being connected to the emitter electrode of the other transistor wherein the said transisors conduct alternately and means connected across the base emitter electrodes of the second transistor, so that the rectifier circuit presents to the source of input signal substantially equal impedances during each halfwave of the input signal.

2. A circuit as claimed in claim 1 in which the impedance equalising means is a diode poled to conduct current in the same direction as the base emitter electrode path of the second transistor.

3. A circuit as claimed in claim 2 in which a third transistor having its base and collector electrodes strapped is used as a diode.

4. A circuit as claimed in claim 3 in which all three transistors are in the form of an integrated circuit module.

References Cited

UNITED STATES PATENTS

| | | | |
|---|---|---|---|
| 2,953,738 | 9/1960 | Bright | 321—47 |
| 3,012,182 | 12/1961 | Ford | 321—47 |
| 3,022,454 | 2/1962 | Millis | 321—47 |
| 3,083,328 | 3/1963 | Mallery et al. | 321—47X |
| 3,419,787 | 12/1968 | Baehre | 321—43 |
| 3,434,034 | 3/1969 | Garber et al. | 321—43 |

FOREIGN PATENTS

| | | | |
|---|---|---|---|
| 447,358 | 3/1968 | Switzerland | 321—47 |

OTHER REFERENCES

RCA Technical Notes, "High Efficiency Low Voltage Rectifier," RCATN No.: 627, August 1965, 321—8.

WILLIAM M. SHOOP, Jr., Primary Examiner